US012651590B2

(12) United States Patent
Lu et al.

(10) Patent No.: US 12,651,590 B2
(45) Date of Patent: Jun. 9, 2026

(54) HEADPHONE SPEECH LISTENING BASED ON AMBIENT NOISE

(71) Applicant: Apple Inc., Cupertino, CA (US)

(72) Inventors: Yang Lu, San Jose, CA (US); Carlos M. Avendano, Campbell, CA (US); Tony S. Verma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 18/346,085

(22) Filed: Jun. 30, 2023

(65) Prior Publication Data

US 2024/0005903 A1 Jan. 4, 2024

Related U.S. Application Data

(60) Provisional application No. 63/357,475, filed on Jun. 30, 2022.

(51) Int. Cl.
*G10K 11/178* (2006.01)
*H04R 1/10* (2026.01)
*G10L 21/0216* (2013.01)

(52) U.S. Cl.
CPC .. *G10K 11/17854* (2018.01); *G10K 11/17823* (2018.01); *G10K 11/17827* (2018.01);
(Continued)

(58) Field of Classification Search
CPC .... H04R 2460/01; H04R 5/033; H04R 3/005; G10K 2210/501; G10K 11/17837;
(Continued)

(56) References Cited

U.S. PATENT DOCUMENTS 8,638,961 B2 1/2014 Pontoppidan
9,633,671 B2 4/2017 Giacobello et al.
(Continued)

FOREIGN PATENT DOCUMENTS

EP 3412036 A1 12/2018
WO 2018141464 A1 8/2018

OTHER PUBLICATIONS

Wang et al., "Supervised Speech Separation Based on Deep Learning: An Overview", received from https://ieeexplore.ieee.org/document/8369155, May 30, 2018, 27 pages.
(Continued)

*Primary Examiner* — Carolyn R Edwards
*Assistant Examiner* — Friedrich Fahnert
(74) *Attorney, Agent, or Firm* — Aikin & Gallant, LLP

(57) ABSTRACT

Microphone signals of a primary headphone are processed and either a first transparency mode of operation is activated or a second transparency mode of operation. In another aspect, a processor enters different configurations in response to estimated ambient acoustic noise being lower or higher than a threshold, wherein in a first configuration a transparency audio signal is adapted via target voice and wearer voice processing (TVWVP) of a microphone signal to boost detected speech frequencies in the transparency audio signal, and in a second configuration the TVWVP is controlled to, as the estimated ambient acoustic noise increases, reduce boosting of, or not boost at all, the detected speech frequencies in the transparency audio signal. Other aspects are also described and claimed.

18 Claims, 6 Drawing Sheets

(52) U.S. Cl.
CPC .. *G10K 11/17879* (2018.01); *G10K 11/17881* (2018.01); *H04R 1/1083* (2013.01); *G10L 2021/02166* (2013.01); *H04R 2460/13* (2013.01)

(58) Field of Classification Search
CPC ...... G10K 11/17885; G10K 2210/1081; G10L 21/0272; G10L 21/0208
USPC .......................................................... 381/71.1
See application file for complete search history.

(56) References Cited

U.S. PATENT DOCUMENTS

| | | | | |
|---|---|---|---|---|
| 10,034,092 | B1 | 7/2018 | Nawfal et al. | |
| 11,227,623 | B1 * | 1/2022 | Vitt | G06F 3/017 |
| 11,276,384 | B2 | 3/2022 | Woodruff et al. | |
| 11,393,486 | B1 | 7/2022 | Woodruff et al. | |
| 2010/0183164 | A1 | 7/2010 | Elmedyb et al. | |
| 2015/0264469 | A1 | 9/2015 | Murata et al. | |
| 2017/0194020 | A1 | 7/2017 | Miller et al. | |
| 2020/0380945 | A1 * | 12/2020 | Woodruff | G10K 11/178 |
| 2021/0250683 | A1 * | 8/2021 | Han | H04M 1/0243 |
| 2021/0390972 | A1 | 12/2021 | Lu et al. | |
| 2021/0397407 | A1 | 12/2021 | Eubank et al. | |
| 2022/0270629 | A1 | 8/2022 | Avendano et al. | |

OTHER PUBLICATIONS

Swider et al., “Compatison of Delayless Digital Filtering Algorithms and Their Application to Multi-Sensor Signal Processing”, received from https://journals.sagepub.com/doi/10.1177/0142331218799148, Jun. 29, 2018, 16 pages.

Koutrouvelis et al., “Binaural Speech Enhancement with Spatial Cue Preservation Utilising Simultaneous Masking” received from https://www.eurasip.org/Proceedings/Eusipco/Eusipco2017/papers/1570347090.pdf, 2017, 5 pages.

Dr. Harry Levitt, “Noise Reduction in Hearing Aids: A Review”, received from https://www.rehab.research.va.gov/jour/01/38/1/pdf/levitt.pdf, 2001, 12 pages.

* cited by examiner

HEADPHONE SPEECH LISTENING BASED ON AMBIENT NOISE

This nonprovisional patent application claims the benefit of the earlier filing date of U.S. provisional application No. 63/357,475 filed Jun. 30, 2022.

FIELD

An aspect of the disclosure here relates to digital audio signal processing techniques that reduce the effort by a person of having a conversation with another person in a noisy ambient sound environment. Other aspects are also described and claimed.

BACKGROUND

Having a conversation with someone who is nearby but in a noisy environment, such as in a restaurant, bar, airplane, or a bus, takes effort as it is difficult to hear and understand the other person. A solution that may reduce this effort is to wear headphones that passively isolate the wearer from the noisy environment but also actively reproduce the other person's voice through the headphone's speakers in a so-called transparency function. Such selective reproduction of the ambient sound environment may be achieved by applying beamforming signal processing to the output of a microphone array in the headphones, which focuses sound pickup in the direction of the other talker (and at the same time de-emphasizes or suppresses the pickup of other sounds in the environment.) Such headphones may also have an acoustic noise cancellation, ANC, mode of operation in which a quiet listening experience is created for the wearer by electronically cancelling any undesired ambient sounds that are still being heard by the wearer (due to having leaked past the passive sound isolation of the headphones.)

SUMMARY

An aspect of the disclosure here is a digital audio signal processing technique that helps reduce speech listening effort by a headphone wearer in a noisy environment by suppressing the background noise of the ambient sound environment. Several external microphone signals are passed through a transparency digital filter path that drives a speaker of the headphone. In a sidechain process, different sounds are separated, e.g., the wearer's voice and another talker's voice, into respective frequency domain filter definitions (or frequency domain masks), on a per audio frame basis, and those frequency domain filters are then processed to update, on a per audio frame basis, the low latency time domain digital filters of a first transparency path that is filtering the external microphone signals before driving a headphone speaker. While so doing the process can also independently raise and lower each of the separate sounds depending on the wearer's context or use case, based on output from various sensors (including the external microphone signals), to improve the wearer's listening experience.

For the wearer who has an audiogram (hearing test results having non-zero dB Hearing Loss values) stored in their headphone or companion device such as a smartphone, there is a second transparency mode of operation in which a personalized enhancement path (instead of the transparency path) is active. The personalized enhancement path also contains time domain digital filters that are configured to suppress background noise, but the path uses high latency digital filters (their latency is higher than those of the transparency path) and also provides some amplification of the reproduced ambient sounds based on the audiogram which compensates for the frequency dependent hearing sensitivity of the headset wearer.

Such headphones may also have feedforward and feedback acoustic noise cancellation, ANC, paths that may be activated simultaneously with either the transparency path or the personalized enhancement path, or separately to produce a quiet listening experience, to further tailor the headphone wearer's listening experience to different usage scenarios.

In another aspect, data (control values, not audio signals) that is relevant to improving the transparency, personalized enhancement, or ANC experience is shared between primary and secondary headphones, or between a headphone and a companion device of the wearer such as a smartphone, via wireless communications links to the headphones.

In another aspect, multiple transparency modes of operation are described with varying speech boosting contributions by target voice and wearer voice processing (TVWP.)

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
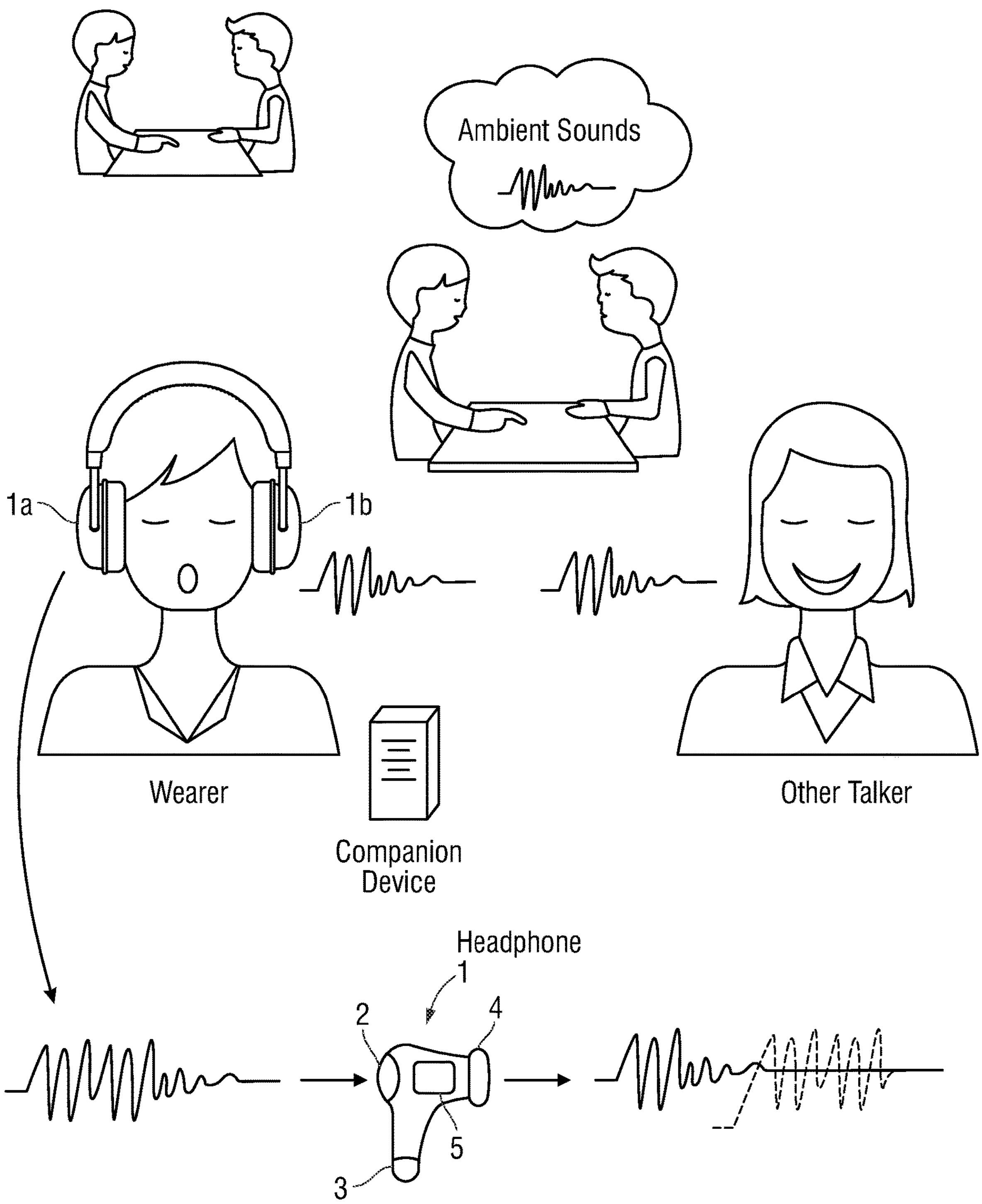
FIG. 1 depicts an example of a wearer who is listening to their ambient sound environment using headphones.

FIG. 1 depicts an example of a headphone wearer's listening experience in a noisy ambient sound environment. The wearer is a person who is carrying on a conversation with another person who is nearby live, e.g., in the same room. At the same there is undesired ambient sound that would be heard by the wearer such as non-speech sounds and, in the example depicted, other persons who are also talking but are farther way. This might be a conversation in a restaurant, bar, airplane, or a bus, which takes effort as it is difficult for one person to hear and understand even a nearby talker. A solution that may reduce this effort is to wear headphones that to some level passively isolate the wearer from the noisy environment but also actively reproduces the other talker's speech. The headphone 1 may be a primary headphone 1*a* or a secondary headphone 1*b* that together form a headset, where the terms primary and secondary are used to distinguish between the two headphones of a headset (and primary may refer to either the left headphone or the right headphone) and in some cases to define certain actions that are performed by one and not the other. The headphone 1 may be an earpiece of an over-the-ear headset, an on-the-ear headset, an in-ear headset (also referred to as earbuds, which may be loose fitting or of an acoustically sealing type) or another against-the-ear device.

The headphone 1 is part of an audio system that has a digital audio processor 5, two or more external microphones 2, 3, at least one internal microphone (not shown in the figure), and a headphone speaker 4, all of which may be integrated within the housing of the headphone 1. The internal microphone may be one that is arranged and configured to directly receive the sound reproduced by the speaker 4 and is sometimes referred to as an error microphone. The external microphone 2 is arranged and configured to receive ambient sound directly (or is open to the ambient directly) and is sometimes referred to as a reference microphone. The external microphone 3 is arranged and configured to be more responsive than the external microphone 2 when picking up the sound of the wearer voice and is sometimes referred to as a voice microphone due to being located closer the wearer's mouth than the external microphone 2.

The audio system actively reproduces the other talker's speech (that has been picked up by the external microphones 2, 3) through the headphone speaker 4 while the processor 5 is suppressing the background noise, in a so-called transparency function. The transparency function may be implemented separately in each of the primary headphone 1*a* and the secondary headphone 1*b*, using much the same methodology described below. The primary headphone 1*a* may be in wireless data communication with the secondary headphone 1*b*, for purposes of sharing control data as described further below in certain aspects of the disclosure here. Also, one or both of the headphones may also be in wireless communication with a companion device (e.g., a smartphone) of the wearer, for purposes of for example receiving from the companion device a user content playback signal (e.g., a downlink call signal, a media player signal), sending an external microphone signal to the companion device as an uplink call signal, or receiving control data from the companion device that configures the transparency function as it is being performed in the headphone 1.

Figure 2:
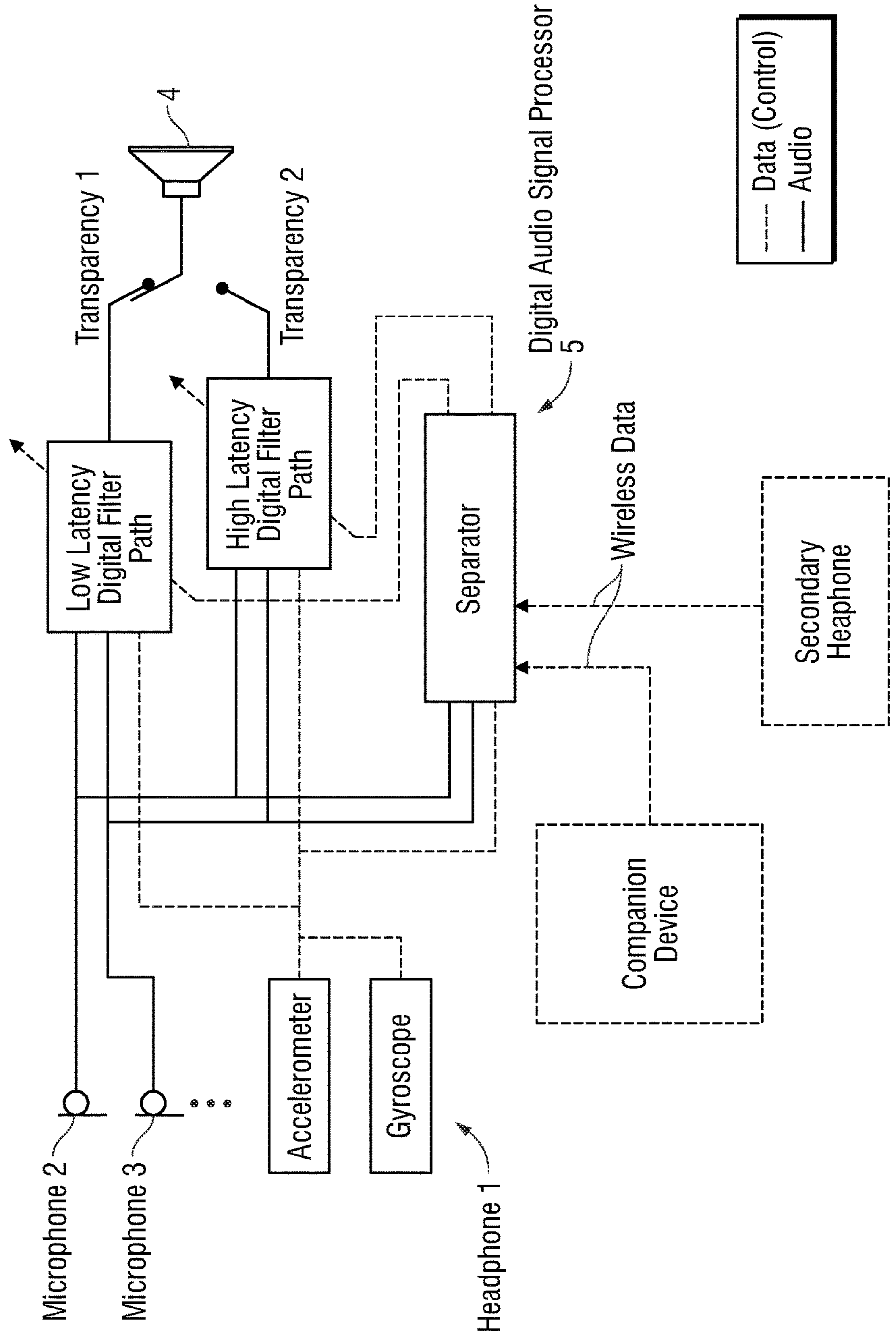
FIG. 2 is a block diagram of a headphone having digital audio signal processing that implements at least two transparency modes of operation for the headphone in which the wearer's speech listening effort is advantageously reduced.

Referring now to FIG. 2, this is a block diagram of the headphone 1 and how the digital audio signal processor 5 implements at least two transparency modes of operation for the headphone 1, in which the wearer's speech listening effort during a conversation with another talker is advantageously reduced. Note the demarcation of the data (control) and the audio signal paths. The processor 5 has a low latency digital filter path (also referred to as a transparency digital filter path) through which two or more external microphone signals 2, 3 of the headphone 1 are filtered before driving the speaker 4 of the headphone 4. There is also a high latency digital filter path (also referred to as a personalized enhancement digital filter path), which has a higher latency than the transparency digital filter path, through which the external microphone signals 2, 3 are filtered before driving the speaker 4. The digital filters of both the low latency digital filter path and the high latency digital filter path may be time domain digital filters that perform time domain, discrete time convolution upon a pulse density modulation, PDM, version of the external microphone (audio) signals at their inputs. In one aspect, the filters of the low latency digital filter path are implemented using time domain, hardware-only digital filters, while those of the high latency digital filter path need only be implemented as software-only filters which have higher latency but the higher latency can be tolerated by wearers who have hearing loss. In one aspect, the low latency digital filter path has a latency of less than ten microseconds, and the high latency digital filter path has a latency that is longer than that of the low latency digital filter path.

Still referring to FIG. 2, the switch symbol indicates that during normal headset operation only one of the low latency and high latency paths is active (driving the speaker 4) at any given time: the processor 5 has a first transparency mode of operation in which the low latency digital filter path (transparency) is active while the high latency digital filter path (personalized enhancement) is inactive; and a second transparency mode of operation in which the low latency digital filter path (transparency) is inactive while the high latency digital filter path (personalized enhancement) is active. In the second transparency mode of operation in which the high latency path is active, that path provides hearing loss compensation as it operates upon the external microphone signals. This compensation may be in the form of a boost or amplification in certain frequency bins in accordance with an audiogram of the wearer. In one aspect, the second transparency mode of operation is selected by the processor 5 if the processor can access a stored audiogram (of the wearer), for example stored in memory within the headphone 1, which has non-zero dB Hearing Loss, dBHL, values, else the processor selects the first transparency mode of operation.

In both the first and second transparency modes, a separator is configuring the digital filter coefficients of whichever path (either the low latency path or the high latency path) is active. The separator does so by processing, e.g., using a machine learning, ML, model the external microphone signals to produce, in parallel, i) a number of instances, over time, of a first frequency domain filter (or frequency domain mask) that represents a first sound source in the ambient sound environment, and ii) a number of instances of a second frequency domain filter (or frequency domain mask) that represents a second sound source in the ambient sound environment. The separator uses these first and second frequency domain filters to update or configure the digital filter coefficients of the low latency path or the high latency path which is driving the speaker 4 (depending on which transparency mode the processor is operating in.) The separator has a latency that is longer than that of the high latency digital filter path.

Figure 3A:
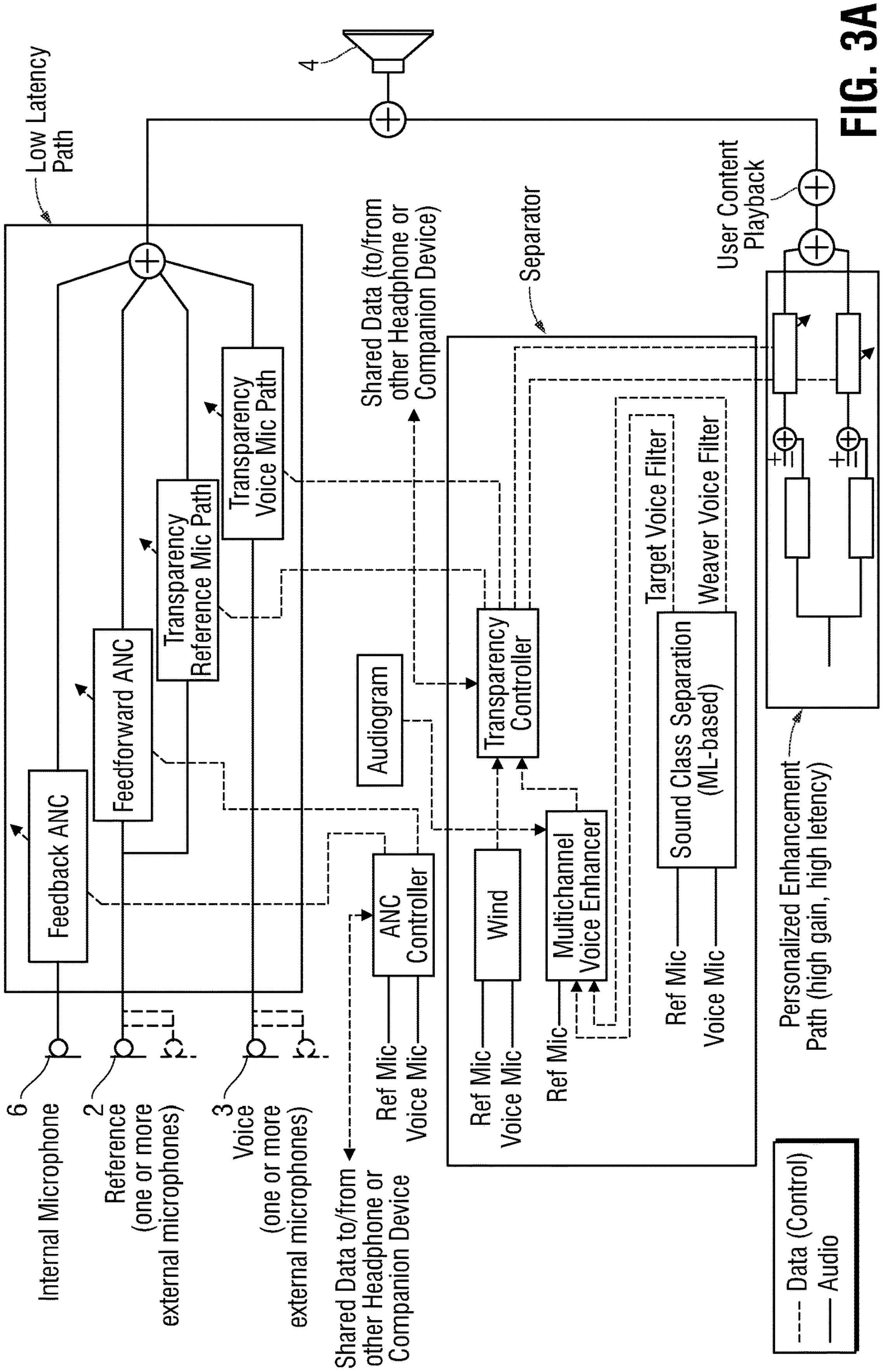
FIG. 3A is a block diagram of details of the low latency path, the separator, and an ANC subsystem as an example of the digital audio signal processing.
Figure 3B:
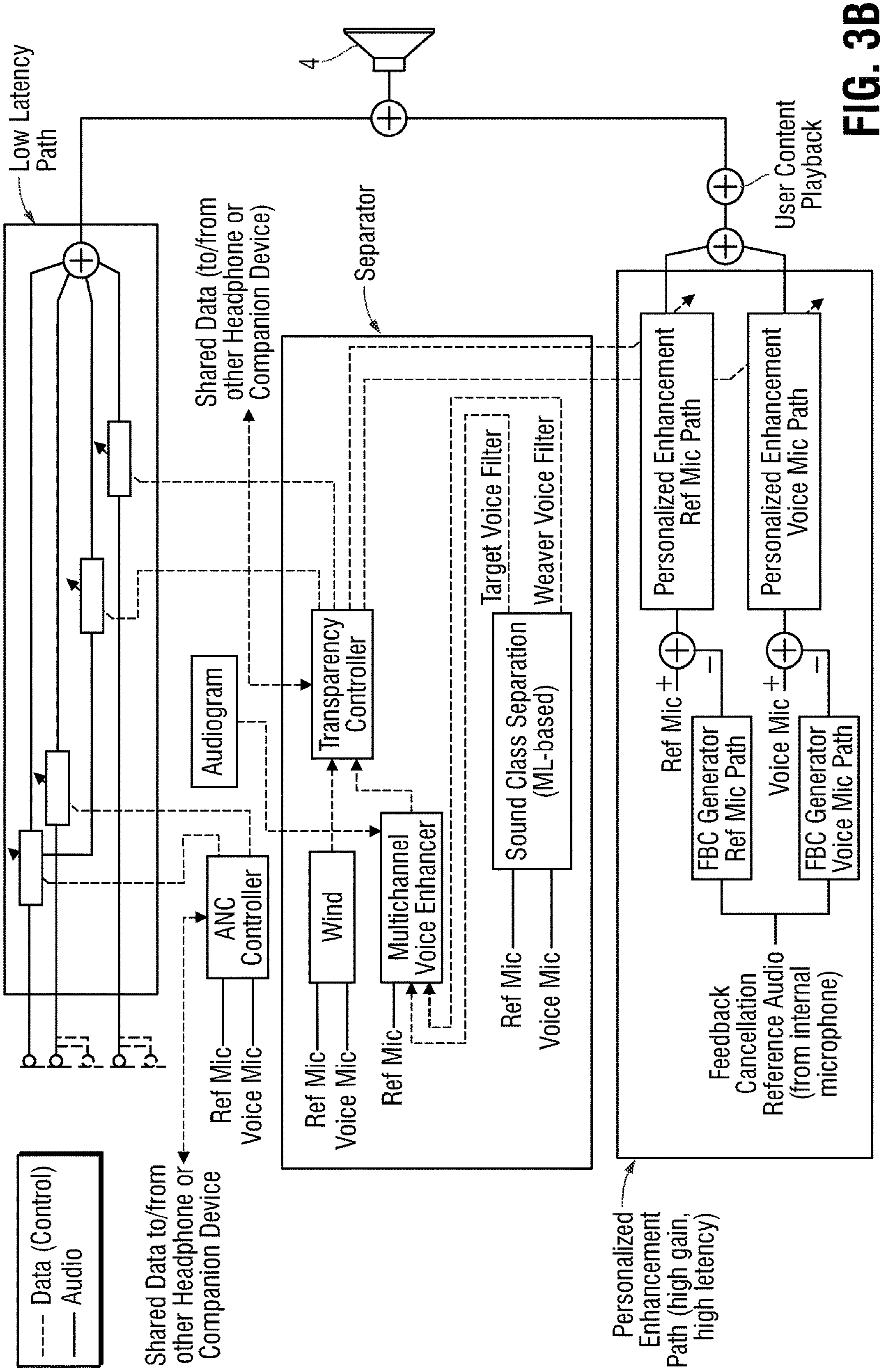
FIG. 3B is a block diagram of details of the high latency path, the separator, and the ANC subsystem as an example of the digital audio signal processing.

In both the first transparency mode and the second transparency mode, the speaker 4 is reproducing the first and second sound sources with the benefit of the separator suppressing background noise of the ambient sound environment. In the case of FIG. 1, the first sound source is the wearer's voice, and the second sound source is the other talker's voice. FIG. 3A and FIG. 3B are block diagrams of details of an example of the digital audio signal processor 5 that can achieve such a result FIG. 3A shows details of the low latency path, the separator, an ANC subsystem, but not any details of the high latency path (personalized enhancement path) while FIG. 3B shows details of the high latency path (in addition to the same separator and ANC subsystem details.) Both diagrams show an example of the separator of FIG. 2 being implemented by the following functions (which may be performed by the processor 5 configured or programmed by software stored in memory of the headphone 1). A machine learning model, ML, based sound class separation module produces the first frequency domain filter and the second frequency domain filter based on the external microphone signals. Note here that as an option, the ML-based sound class separation module can be configured to produce the first and second frequency domain filters by also considering other sensor outputs such as a gyroscope output that can be interpreted to represent head motions of the wearer, an accelerometer output representing bone conduction pickup of the wearer's voice, or both. In the example diagram here, the first filter is referred to as being a wearer voice filter (representing voice of the wearer of the headphone 1) while the second filter is referred to as being a target voice filter (representing voice of another talker.) These filters are being updated over time, forming a time sequence of instances of each filter.

Next, a multi-channel speech enhancer (or multichannel voice enhancer) produces the following two frequency domain filters, in response to receiving one or more of the plurality of external microphone signals (in this example, at least one produced by the external microphone 2 which is a so-called reference microphone), the first and second frequency domain filters, and a frequency domain noise estimate produced by a one channel or two channel noise estimator (not shown) whose input includes one or more of the external microphone signals: i) an upward compression filter when the processor 5 is operating in the second transparency mode of operation, and ii) a noise suppression filter in both the first and second transparency modes of operation. In one aspect, the multi-channel speech enhancer does so, based only on statistical signal processing algorithms, but in other versions the enhancer may be ML-model based. The upward compression filter controls how much the wearer's voice is attenuated relative to the target voice; it is computed based on the wearer's audiogram and as such its use avoids over amplification of the wearer's voice when the processor is in the second transparency mode of operation (where the audiogram contains non-zero dBHL values that boost gain in certain frequency bins.) The other output of the speech enhancer, namely the noise suppression filter, is generated in both the first and second transparency modes of operation and could be designed to perform beamforming to for example suppress sound sources that are in an undesired direction.

The separator also has a wind detector that, responsive to the external microphone signals, produces a wind detection frequency domain filter which controls how much wind noise is to be attenuated. The wind detector may be active in both the first and second transparency modes of operation.

The frequency domain filter produced by the wind detection filter, together with the upward compression filter and the noise suppression filter produced by the multichannel speech enhancer, are then processed by a transparency controller to update, on a per audio frame basis, the digital filter coefficients of the low latency digital filter path (transparency) and the high latency digital filter path (personalized enhancement.) The transparency controller does so by combining its various input frequency domain filters into a time domain filter definition for each of the digital filters in the respective paths, as follows:

when the processor is in the first transparency mode, referring now to FIG. 3A, the transparency controller is updating the filter coefficients of the transparency reference microphone path (digital filter) and the transparency voice microphone path (digital filter) of the low latency path section, both of which are active simultaneously and are filtering their respective external microphone signals as shown (before driving the speaker 4 of the headphone 1); and when the processor is in the second transparency mode, referring now to FIG. 3B, the transparency controller is updating the filter coefficients of the personalized enhancement reference microphone path (digital filter) and the personalized enhancement voice microphone path (digital filter) in the high latency path section, both of which are active simultaneously and are filtering their respective feedback cancellation adjusted external microphone signals as shown, before driving the speaker 4 of the headphone 1.

Referring to FIG. 2, this figure shows another aspect of the disclosure here, where the separator in the primary headphone 1*a* (see FIG. 1) is being assisted with shared data that has been produced by another instance of the separator which is operating concurrently in the secondary headphone 1*b* of a headset. The shared data is referred to in the figure as wireless data. The separator in the primary headphone 1*a* receives this wireless data over-the-air (e.g., via a BLUETOOTH connection) from another instance of the separator that is operating in the secondary headphone 1*b*. To meet reduced power consumption goals, the wireless data is transmitted and received at a rate that is slower than the latency of the separator. In addition, to reduce wireless bandwidth requirements, the shared wireless data is smaller than the first frequency domain filter or the second frequency domain filter.

The wireless data may be used by the separator to adjust binaural cues that the headset wearer experiences when hearing the second sound source (e.g., another talker's voice) that is being reproduced through both the speaker 4 of the primary headphone 1*a* and through the speaker 4 of the secondary headphone 1*b*. In one example, referring to FIG. 3A and FIG. 3B, the transparency controller updates the filter coefficients of the low latency and high latency digital filter paths by considering the one or more values that are in the wireless data. This value may be used by the separator, and in particular the transparency controller, to time align i) an attenuation operation that will be performed in the low or high latency digital filter path of the primary headphone 1*a*, with ii) another instance of the attenuation operation that is performed in another instance of the low or high latency digital filter path, respectively, which is active in the processor of the secondary headphone 1*b*. As an example, the attenuation operation may serve to attenuate the second sound source which could be located in a left hemisphere about the wearer's head (with the wearer looking straight ahead and their head positioned at the center of the sphere), and the time alignment of this attenuation preserves binaural cues that the wearer experiences when hearing the second sound source, so that the second source is experienced by the wearer as being properly positioned to the wearer's left.

In another aspect of the wireless data sharing between the primary and secondary headphones, each of the headphones has an instance of a voice activity detector (VAD) that operates on one or more local microphone signals (from microphones that are local to, e.g., integrated in the respective headphone, which may include the external microphone 2 and the external microphone 3) and perhaps also on a bone conduction sensor signal (e.g., from an accelerometer in the respective headphone.) Selected output values of the VAD, e.g., as a time sequence of binary values being speech vs. non-speech in each frequency bin, are transmitted over the air to the other headphone. The separator in the other headphone receives this wireless data and processes it, e.g., using the ML model described above, to produce, in parallel, its first frequency domain filter (or frequency domain mask) that represents the first sound source in the ambient sound environment, and its second frequency domain filter (or frequency domain mask) that represents the second sound source in the ambient sound environment. In other words, the ML model that produces the first and second frequency domain filters in the secondary headphone is being assisted by a VAD in the primary headphone.

In yet another aspect of the disclosure here, the headphone 1 also has an acoustic noise cancellation, ANC, subsystem whose components include, as seen in FIG. 3A, the internal microphone 6 (sometimes referred to as an error microphone), the external microphone 2 (sometimes referred to a reference microphone), an ANC adaptive filter controller, and feedforward and feedback ANC adaptive filters. These filters may be deemed to be in the low latency path as shown, due to them being low latency time domain digital filters as described above (e.g., hardware-only time domain digital filters.) They produce anti-noise signals that serve the following purposes.

The feedback ANC digital filter path through which the internal microphone signal of the primary headphone is filtered to produce an anti-noise signal that drives the speaker 4, serves to make the listening experience more pleasant in several modes of operation of the processor 5. The feedback ANC filter path may be active in both the first and second transparency modes of operation described above.

The feedforward ANC digital filter path through which one or more of the external microphone signals (at least the reference microphone signal) are filtered to produce an anti-noise signal that drives the speaker 4, may be active in a so-called full ANC mode of operation. In the full ANC mode of operation, the feedforward ANC filter path is active but the transparency path filters (in the low latency path) and the personalized enhancement paths filters (in the high latency path) are inactive. This results in the anti-noise signal creating a quiet listening experience for the wearer by electronically cancelling any ambient sounds that are still being heard by the wearer (due to having leaked past the passive sound isolation of the headphones.) In addition, the feedforward ANC digital filter path may also be active (to produce anti-noise) in both the first and second transparency modes of operation, when they react to reduce the severity of for example an undesirably loud ambient sound that the wearer would otherwise hear more strongly.

Figure 4:
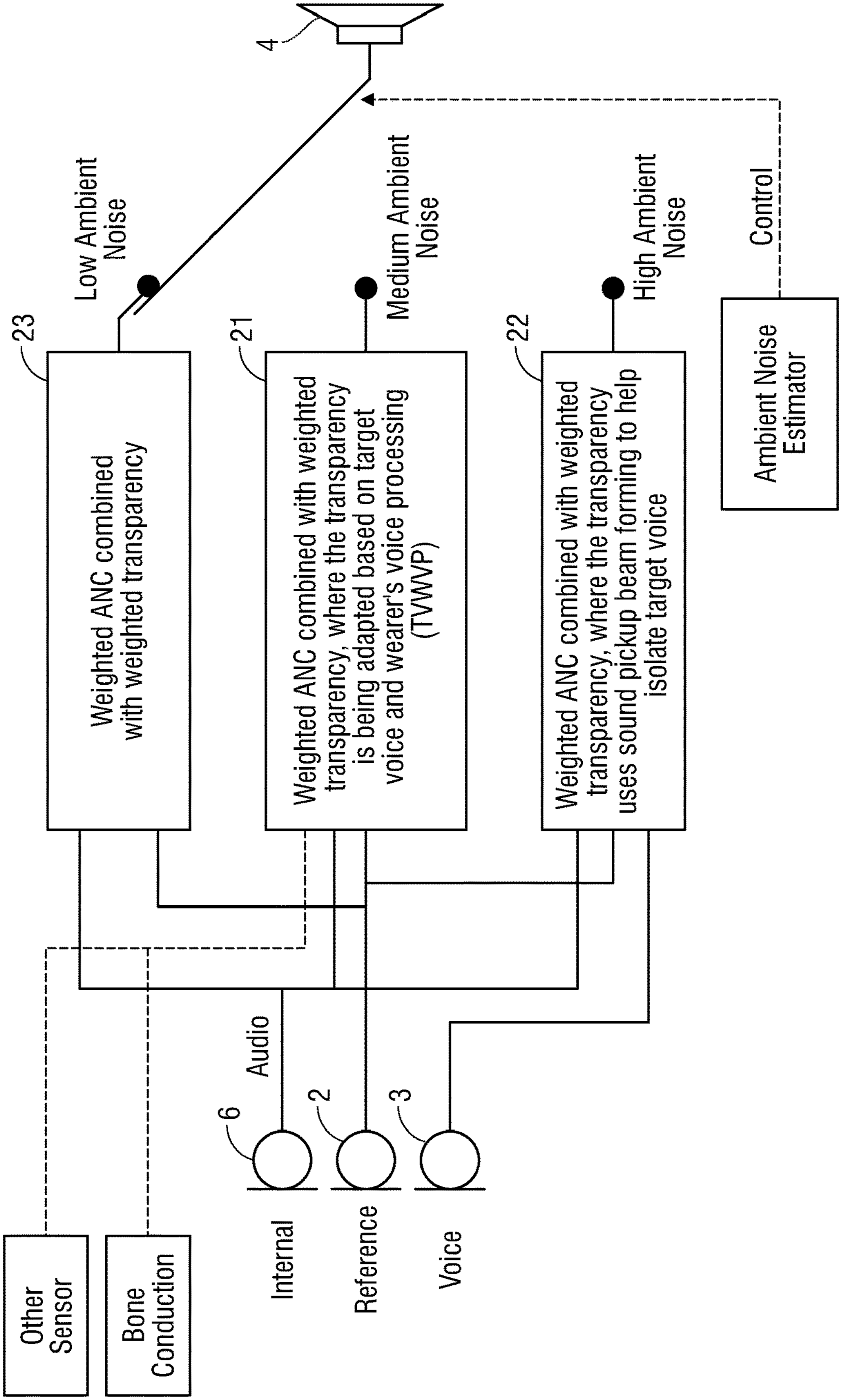
FIG. 4 illustrates another aspect being a digital audio processor that has multiple weighted-ANC-weighted-transparency modes of operation with varying contributions by target voice and wearer voice processing (TVWP.)
Figure 5:
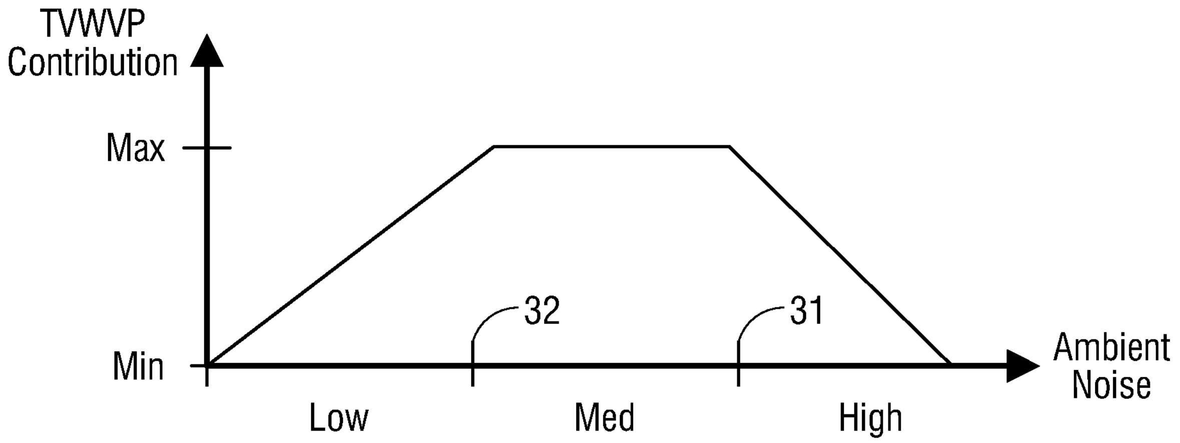
FIG. 5 depicts an example of how the speech boosting contribution of the TVWP varies as a function of the estimated ambient noise.

In another aspect, illustrated using the example diagram and curve in FIG. 4 and FIG. 5, the digital audio processor 5 is configured to be operable in at least two, weighted-ANC-weighted-transparency modes of operation. Three such modes are shown in the figures (low, medium, and high, represented by the rotary switch symbol), but finer granularity having more than three modes is also possible as mentioned below. In each of these modes, the digital audio processor 5 combines a weighted version of a feedforward ANC anti-noise audio signal produced by a digital filter (e.g., an adaptive filter) in a feedforward ANC filter path with a weighted version of an audio transparency signal produced by a digital filter in a transparency path, before driving the speaker 4 with that combination. For example, the weight applied to the transparency signal may be $0<A<1$, while the weight applied to the anti-noise signal may be $1-A$.

In one aspect, the weight A may be a gain vector whose gain values can be set on a per frequency bin basis. In another aspect, the weight A is a scalar or wideband value. Within a given mode of operation, the weight A may be varied as a function of the current wearer's context or use case changing, e.g., the wearer moves from a loud ambient environment to a quiet ambient environment which may be determined by computing an estimate of the current ambient noise (or the undesired sound in the ambient environment of the headphone for example as a sound pressure level, SPL.)

The anti-noise and transparency signals may be produced by respective signal processing paths such as described above in connection with FIG. 3A or FIG. 3B, that are operating upon at least one input audio signal being the microphone signal from the external microphone 2. The transparency path and the feedforward ANC filter path combine to drive the speaker 4. As illustrated in FIG. 4, the weighted-ANC-weighted-transparency modes of operation include the processor 5 being, one at a time, in a first configuration 21 and in a second configuration 22.

The processor 5 enters the first configuration 21 in response to the estimated ambient acoustic noise being lower than a first threshold 31—see FIG. 5. When the processor 5 is in the first configuration 21, it is adapting the transparency path that is producing the transparency signal (e.g., by updating the coefficients of a digital filter in the path), through or via target voice and wearer voice processing (TVWVP.)

In one aspect, the processor 5 performs the TVWVP in accordance with the techniques described above in connection FIG. 3A or FIG. 3B, or in accordance with other techniques, to separate effects of a wearer voice (voice of the wearer) from effects of a target voice (voice of a person near the wearer) in the signal from the external microphone 2, to compute an output transparency gain vector G (gain values per frequency bin. The processor then in accordance with the gain vector G computes the coefficients that define an audio filter of the transparency path. In other words, G directly determines how the headphone wearer perceives or hears their ambient environment (via the transparency audio signal.)

The TVWP may perform the following process to compute a speech boost gain vector, Gb, which defines a gain boost value such as between 0 and 1 for each detected frequency bin of interest, e.g., the ones that a detector indicates are likely to contain speech of the target voice of a person near the wearer or of the wearer voice (own voice):

$$\text{deltaG}=20\log 10(g\_ssl)-20\log 10(g\_f);$$

r_b (as a value between 0 and) is determined using for example a linear mapping from deltaG;

$$Gb = \text{own\_voice\_presence\_probability } x\ r\_b\ x \text{ boost gain for own voice(a function of ambient acoustic noise level or the gain } A)+$$

$$(1\text{-own-voice\_presence\_probability})x\ r\_b\ x \text{ boost gain for target voice(a function of the ambient acoustic noise level)}.$$

In one instance, an initial transparency gain vector Gt is computed with a goal of resulting in a flat, gain frequency response experienced in the wearer's ear canal (e.g., as an attenuated version of the ambient sound environment) when both ANC and transparency functions are active. The goal of Gt resulting a flat frequency response may be achieved by appropriately setting the weight A. Gt is then combined, on a per frequency bin basis, with the speech boost gain vector, Gb, to obtain the output vector G. Combining Gb with the intentionally flat Gt will result in "gain bumps" that are in response to having detected the target voice. As a result of this TVWVP, the wearer will better hear the speech of the nearby person despite the ambient noise.

The processor 5 enters the second configuration 22 in response to the estimated ambient acoustic noise being higher than the first threshold 31. When the processor 5 is in the second configuration 22, the speech boosting effect of the TVWVP is deliberately reduced by the processor 5, e.g., the gain values in Gb are made smaller or even zero. This is because the TVWVP may not be as effective in making the speech of the nearby person (the target voice) more intelligible, in conditions where the ambient noise levels are high. Instead, the processor 5, in the second configuration 22, configures its transparency path to use sound pickup beamforming to help isolate the target voice. The beamforming is applied to the audio signals from at least two of the external microphones 2, 3 (e.g., one or more of several reference microphones plus the voice microphone), to produce the input audio signal of the audio filter in the transparency path. In this manner, sound coming from the direction of the target voice may be spatially favored in contrast to sound coming from undesired sources in other directions, while avoiding any potential artifacts that may be caused by the TVWVP.

FIG. 4 is used to also illustrate another aspect of the disclosure here, namely an instance where the processor 5 is configured to be capable of operating in more than two weighted-ANC-weighted-transparency modes of operation. In particular, the processor 5 enters a third configuration 23 whenever and in response to detecting that the ambient noise level is low. Here, the speech boosting effect of the TVWVP is again deliberately reduced by the processor 5, e.g., the gain values in Gb are made smaller or even zero. This is because the TVWVP may not be needed to make the speech of the nearby person (the target voice) more intelligible, because the ambient environment is quiet. In addition, in the third configuration 23, there is no need to use sound pickup beamforming for the transparency path (to help isolate the target voice.) In this manner, any potential artifacts that may be caused by the TVWVP or by the beamforming are avoided, while also reducing power consumption by the processor 5. Note here that in the third configuration 23, weighted ANC may still be combined with weighted transparency (e.g., by setting the weight A to obtain the flat, gain frequency response mentioned above.)

FIG. 5 depicts an example of how the speech boosting contribution by the TVWP can be varied as a function of the estimated ambient noise. The case of three different ambient conditions is shown, namely low, medium, and high noise levels. The ambient noise level decreases towards the left of the graph, increases towards the right. In the medium noise condition, the TVWVP contribution is maximized, but it is then gradually reduced to a minimum (e.g., where the gain vector Gb is all zero so that speech frequencies are not boosted at all) as the noise levels either reduce in a low noise environment or increase in a high noise environment. To enable operation in the low noise level condition, the estimated ambient acoustic noise is compared with a second threshold 32 that is lower than the first threshold 31; if the estimated ambient acoustic noise is lower than the second threshold 32, then the processor 5 enters the third configuration 23.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. For instance, while the gradual change in the TVWVP contribution is shown in FIG. 5 as being linear on both sides of the medium noise condition, it may alternatively be non-linear or it may have linear and nonlinear segments. The description is thus to be regarded as illustrative instead of limiting.

What is claimed is:

1. A method for digital audio processing, the method comprising:

estimating ambient acoustic noise;

entering a first configuration in response to the estimated ambient acoustic noise being lower than a first threshold, wherein in the first configuration a transparency audio signal is adapted via target voice and wearer voice processing (TVWVP) of a first microphone signal to boost detected speech frequencies in the transparency audio signal;

entering a second configuration in response to the estimated ambient acoustic noise being higher than the first threshold, wherein in the second configuration the TVWVP is controlled to, as the estimated ambient acoustic noise increases, reduce boosting of, or not boost at all, the detected speech frequencies in the transparency audio signal; and entering a third configuration in response to the estimated ambient acoustic noise being lower than a second threshold, the second threshold being lower than the first threshold, wherein in the third configuration the TVWVP is controlled to, as the estimated ambient acoustic noise decreases, reduce boosting of, or not boost at all, the detected speech frequencies in the transparency audio signal.

2. The method of claim 1 wherein in the second configuration, and not in the first configuration, producing the transparency audio signal comprises sound pickup beamforming of the first microphone signal and a second microphone signal.

3. The method of claim 1 further comprising producing the transparency audio signal by processing the first microphone signal;

producing an anti-noise signal by processing the first microphone signal using feedforward acoustic noise cancellation; and combining a weighted version of the transparency audio signal with a weighted version of the anti-noise signal, to drive a speaker.

4. The method of claim 3 further comprising entering a third configuration in response to the estimated ambient acoustic noise being lower than a second threshold, the second threshold being lower than the first threshold, wherein in the third configuration the TVWVP is controlled to, as the estimated ambient acoustic noise decreases, reduce boosting of, or not boost at all, the detected speech frequencies in the transparency audio signal.

5. The method of claim 3 further comprising producing the weighted version of the transparency audio signal and the weighted version of the anti-noise signal, by producing a transparency gain vector that flattens a gain frequency response experienced in an ear canal of a wearer of a headphone in which the first microphone signal is generated.

6. A digital audio processor comprising:

a transparency digital filter path through which a microphone signal is to be filtered to produce a transparency audio signal;

a feedforward acoustic noise cancellation digital filter path through which the microphone signal is filtered to produce an anti-noise signal; and the digital audio processor being configured to:

combine a weighted version of the transparency audio signal with a weighted version of the anti-noise signal, to drive a speaker;

estimate ambient acoustic noise using the microphone signal;

enter a first configuration in response to the estimated ambient acoustic noise being lower than a first threshold, wherein in the first configuration the processor adapts the transparency digital filter path via target voice and wearer voice processing (TVWVP) of at least the microphone signal to boost detected speech frequencies in the transparency audio signal; and enter a second configuration in response to the estimated ambient acoustic noise being higher than the first threshold, wherein in the second configuration the processor controls the TVWVP to, as the estimated ambient acoustic noise increases, reduce boosting of, or not boost at all, the detected speech frequencies in the transparency audio signal.

7. The processor of claim 6 wherein in the second configuration, and not in the first configuration, the processor is configured to produce the transparency audio signal by sound pickup beamforming of the microphone signal and another microphone signal.

8. The processor of claim 7 further configured to enter a third configuration in response to the estimated ambient acoustic noise being lower than a second threshold, the second threshold being lower than the first threshold, wherein in the third configuration the TVWVP is controlled to, as the estimated ambient acoustic noise decreases, reduce boosting of, or not boost at all, the detected speech frequencies in the transparency audio signal.

9. The processor of claim 8 further configured to produce the weighted version of the transparency audio signal and the weighted version of the anti-noise signal, by producing a transparency gain vector that flattens a gain frequency response experienced in an ear canal of a wearer.

10. The processor of claim 6 further configured to enter a third configuration in response to the estimated ambient acoustic noise being lower than a second threshold, the second threshold being lower than the first threshold, wherein in the third configuration the TVWVP is controlled to, as the estimated ambient acoustic noise decreases, reduce boosting of, or not boost at all, the detected speech frequencies in the transparency audio signal.

11. The processor of claim 10 further configured to produce the weighted version of the transparency audio signal and the weight version of the anti-noise signal, by producing a transparency gain vector that flattens a gain frequency response experienced in an ear canal of a headphone wearer.

12. The processor of claim 6 configured to perform the TVWVP by:

processing a bone conduction sensor signal and the microphone signal to separate effects of wearer voice from effects of target voice.

13. An article of manufacture comprising a memory having stored therein instructions that configure a processor to:

estimate ambient acoustic noise;

enter a first configuration in response to the estimated ambient acoustic noise being lower than a first threshold, wherein in the first configuration a transparency audio signal is adapted via target voice and wearer voice processing (TVWVP) of a first microphone signal to boost detected speech frequencies in the transparency audio signal; and enter a second configuration in response to the estimated ambient acoustic noise being higher than the first threshold, wherein in the second configuration the TVWVP is controlled to, as the estimated ambient acoustic noise increases, reduce boosting of, or not boost at all, the detected speech frequencies in the transparency audio signal; and enter a third configuration in response to the estimated ambient acoustic noise being lower than a second threshold, the second threshold being lower than the first threshold, wherein in the third configuration the TVWVP is controlled to, as the estimated ambient acoustic noise decreases, reduce boosting of, or not boost at all, the detected speech frequencies in the transparency audio signal.

14. The article of manufacture of claim 13 wherein in the second configuration, and not in the first configuration, producing the transparency audio signal comprises sound pickup beamforming of the first microphone signal and a second microphone signal.

15. The article of manufacture of claim 13 wherein the instructions configure the processor to:

produce the transparency audio signal by processing the first microphone signal;

produce an anti-noise signal by processing the first microphone signal using feedforward acoustic noise cancellation; and combine a weighted version of the transparency audio signal with a weighted version of the anti-noise signal, to drive a speaker.

16. The article of manufacture of claim 15 wherein the instructions configure the processor to produce the weighted version of the transparency audio signal and the weighted version of the anti-noise signal, by producing a transparency gain vector that flattens a gain frequency response experienced in an ear canal of a wearer of a headphone in which the first microphone signal is generated.

17. The article of manufacture of claim 13 wherein the instructions configure the processor to:

produce the transparency audio signal by processing the first microphone signal;

produce an anti-noise signal by processing the first microphone signal using feedforward acoustic noise cancellation; and produce a weighted version of the transparency audio signal and a weighted version of the anti-noise signal by producing a transparency gain vector that flattens a gain frequency response experienced in an ear canal of a wearer of a headphone in which the first microphone signal is generated.

18. The article of manufacture of claim 17 wherein the instructions configure the processor to:

enter a third configuration in response to the estimated ambient acoustic noise being lower than a second threshold, the second threshold being lower than the first threshold, wherein in the third configuration the TVWVP is controlled to, as the estimated ambient acoustic noise decreases, reduce boosting of, or not boost at all, the detected speech frequencies in the transparency audio signal.

* * * * *